Figure 1:
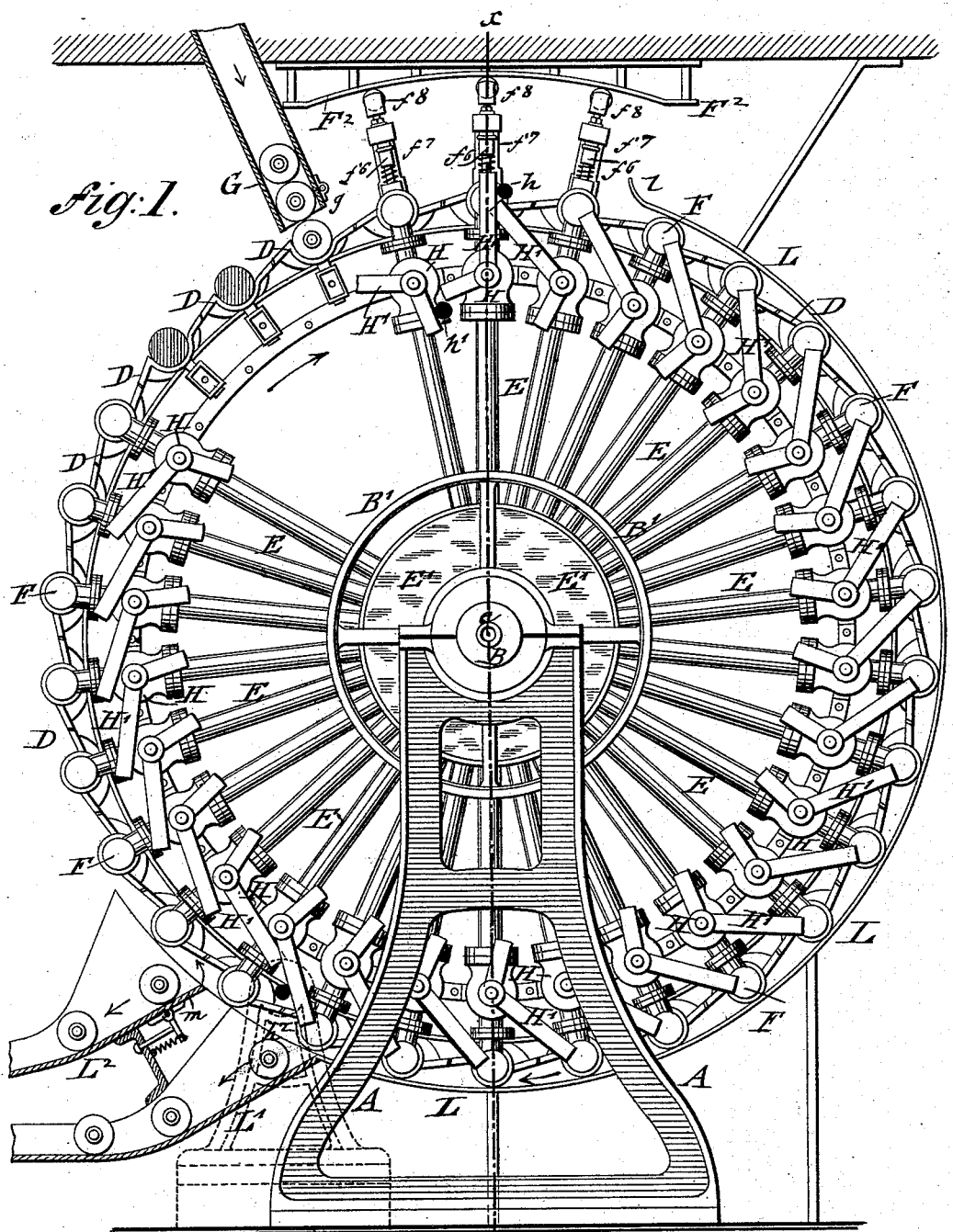

(No Model.) 4 Sheets—Sheet 1.
R. STEEGMÜLLER.
MACHINE FOR TESTING TIN CANS.

No. 410,300. Patented Sept. 3, 1889.

(No Model.) 4 Sheets—Sheet 3.
R. STEEGMÜLLER.
MACHINE FOR TESTING TIN CANS.
No. 410,300. Patented Sept. 3, 1889.
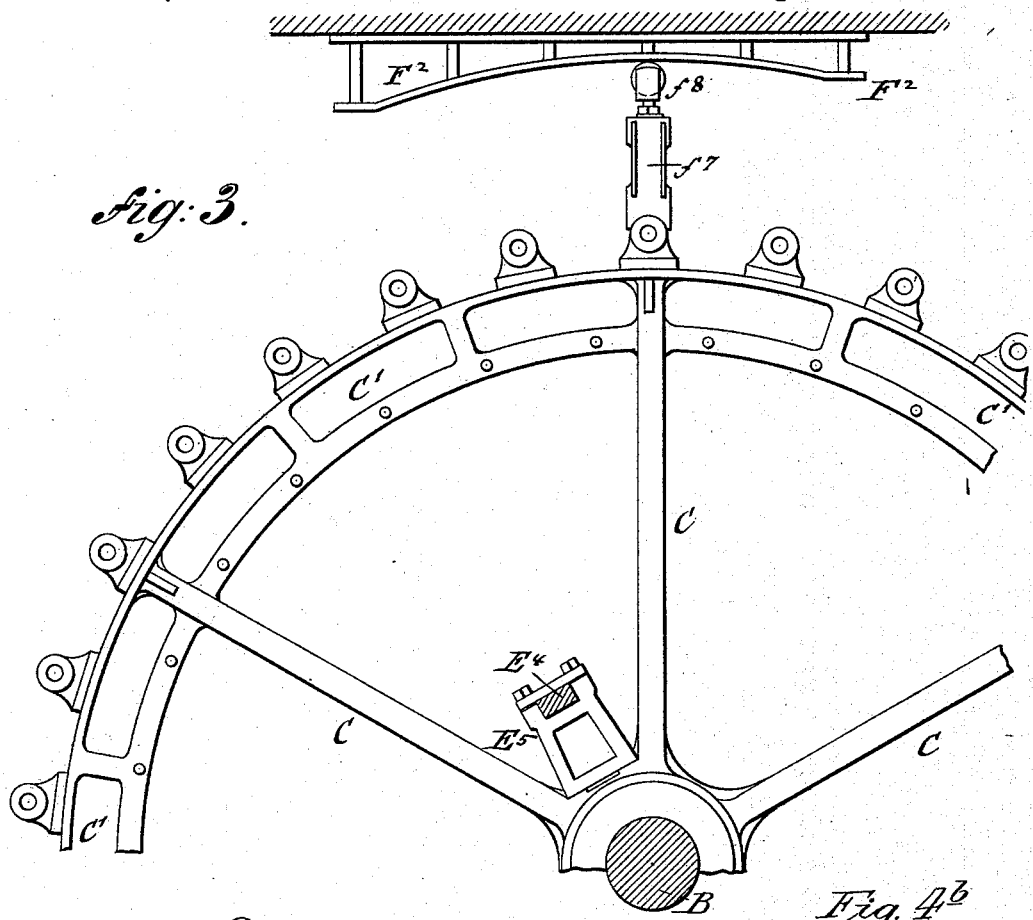
Fig. 3.
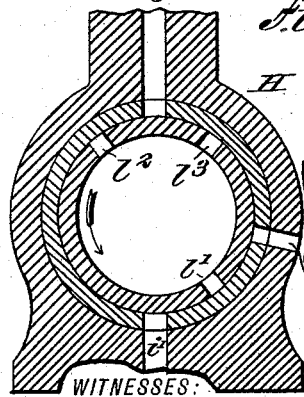
Fig. 4ᵃ
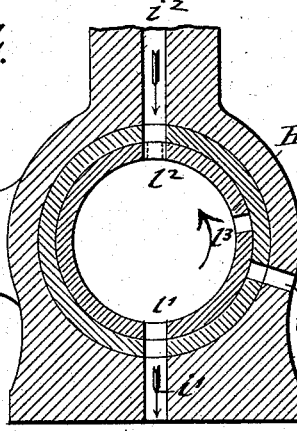
Fig. 4.
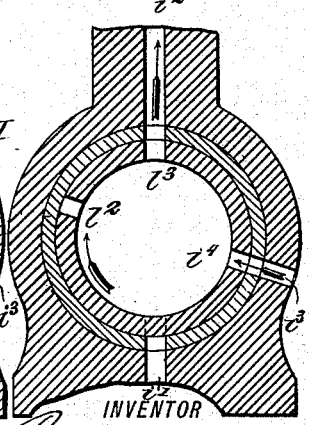
Fig. 4ᵇ
WITNESSES:
A. Schehl.
Carl Key
INVENTOR
Richard Steegmüller
BY Gomez & Raegener
ATTORNEYS.
N. PETERS, Photo-Lithographer, Washington, D. C.

(No Model.) 4 Sheets—Sheet 4.
R. STEEGMÜLLER.
MACHINE FOR TESTING TIN CANS.
No. 410,300. Patented Sept. 3, 1889.
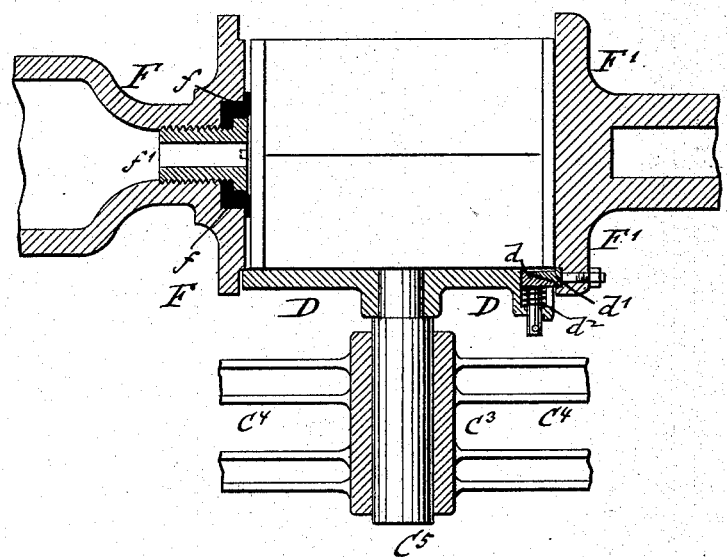
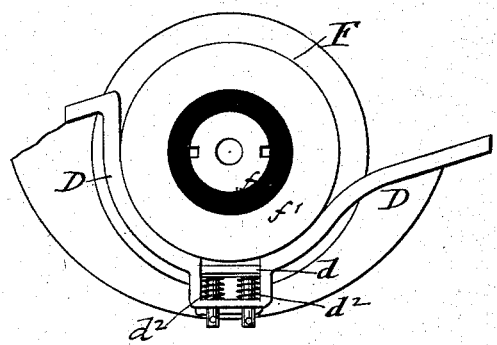
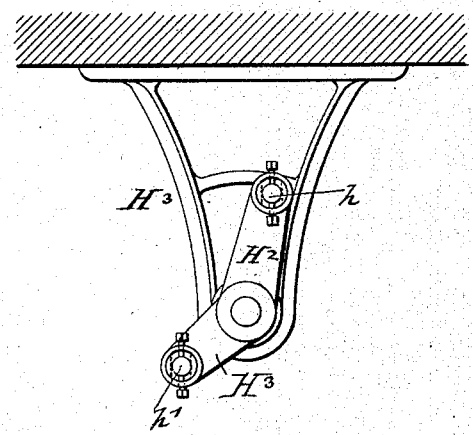

UNITED STATES PATENT OFFICE.

RICHARD STEEGMÜLLER, OF NEW YORK, N. Y.

MACHINE FOR TESTING TIN CANS.

SPECIFICATION forming part of Letters Patent No. 410,300, dated September 3, 1889.

Application filed October 24, 1888. Serial No. 289,050. (No model.)

*To all whom it may concern:*

Be it known that I, RICHARD STEEGMÜLLER, of the city, county, and State of New York, have invented certain new and useful Improvements in Machines for Testing Tin Cans, of which the following is a specification.

This invention has reference to an improved machine for testing tin cans pneumatically in a quick and effective manner by creating a partial vacuum in the cans, and causing thereby the good cans to adhere by suction to the supporting holders or jaws as long as the vacuum is kept up, while the bad and leaky cans are dropped and separated from the good cans, as the vacuum in the same is destroyed by the entrance of air into the cans.

The invention consists of a machine for testing tin cans, which machine comprises a series of can-supporting devices that are arranged equidistantly from the center shaft of the machine and composed of buckets at the circumference of a rotary frame, hollow jaws connected by radial suction-tubes with an air-pump, and intermittently-applied can-holding jaws. The radial suction-tubes of the hollow jaws are provided with valves, to the spindles of which are attached elbow-levers that are actuated by means of fixed pins that are located in the path of said elbow-levers, so as to set the same into a proper position for producing the action of the air-suction apparatus. The can-holding jaws are applied by means of push-levers which are actuated by contact with a stationary cam above the machine. The cans are fed over an inclined chute to the buckets at the upper part of the rotary frame and conducted off by chutes at the lower part of the machine, they being retained on the frame by a stationary guard, which is arranged concentric to the center shaft of the machine. One of the inclined lower chutes serves for conducting off the leaky cans, while a second inclined chute conveys off the good cans, after the elbow-levers of the suction-valves are turned by contact with a stationary pin at the lower part of the machine into the path of said levers, and thereby the air admitted into the cans and the same dropped from the hollow jaws.

The invention consists, further, of pusher-rods by which the can-holding presser-jaws are operated and applied to the bottom of the cans as long as the pusher-rods form contact with the stationary cam, and spring-catches by which the cans are released from the hollow jaws when the holding-jaws are withdrawn as soon as the pressure of the spring-catches overcomes the suction on the jaws by the gradual destruction of the vacuum in bad and leaky cans.

Figure 2:
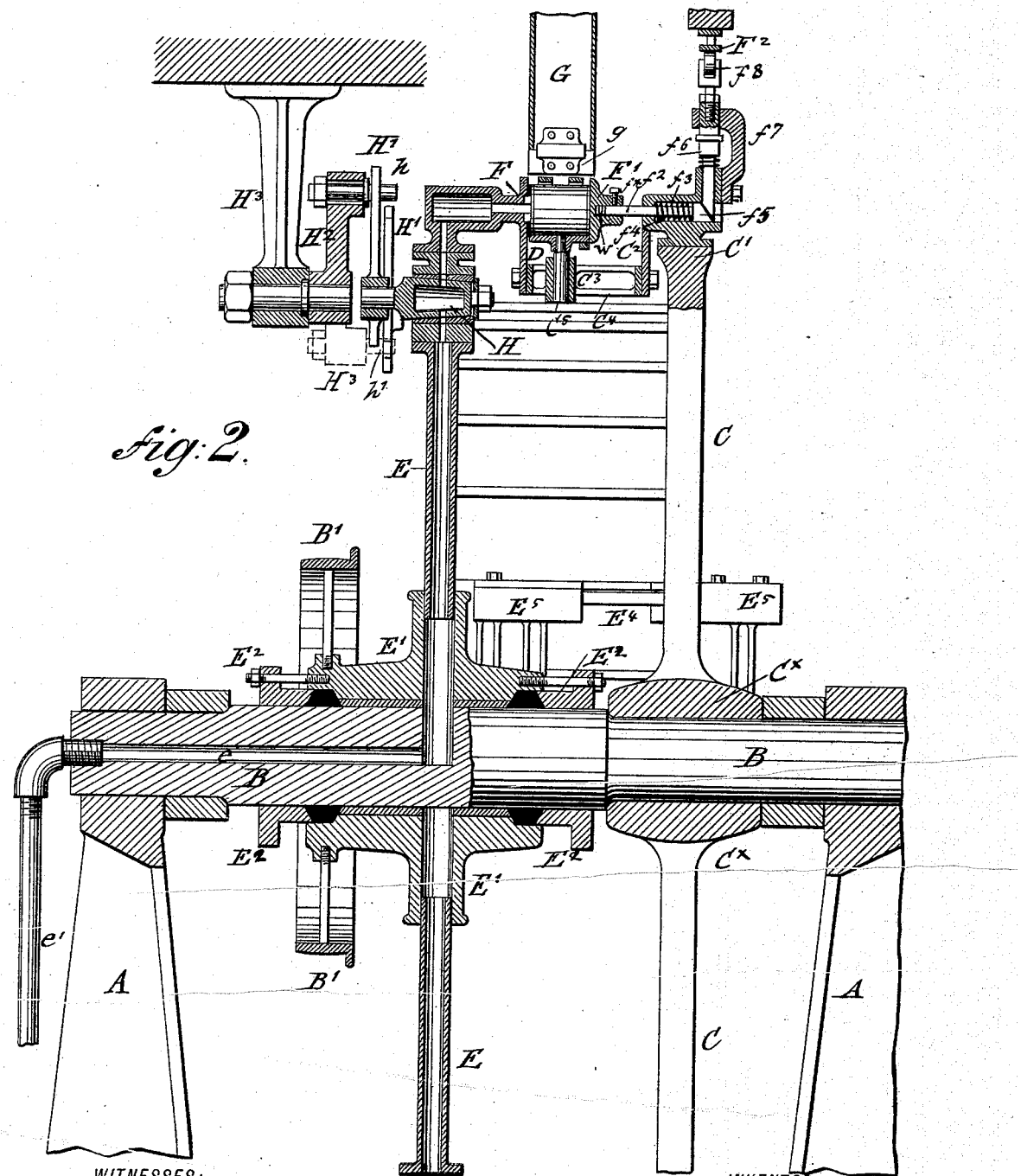

In the accompanying drawings, Figure 1 represents a side elevation of my improved machine for testing tin cans, in which some of the parts are shown in section and other parts removed. Fig. 2 is a vertical transverse section on line $x\ x$, Fig. 1, drawn on a larger scale. Fig. 3 is a side elevation of a part of the machine, taken from the opposite side, and also drawn on a larger scale. Figs. 4, $4^a$, and $4^b$ are detail vertical transverse sections of the valve by which the vacuum in the cans to be tested is established or interrupted, said figures showing the different positions of the valve required for exhausting, testing, and dropping the cans. Fig. 5 is a detail vertical transverse section of the supporting-jaws and bucket for each can; and Figs. 6 and 7 are details showing, respectively, a side view of one of the can-supporting buckets and can-retaining devices and a side view of the stationary pins located in the path of the valve-operating levers, by which the valves are set for establishing or interrupting the vacuum in the cans.

Similar letters of reference indicate corresponding parts.

Referring to the drawings, A represents the upright supporting-standards of my improved machine for testing tin cans. The standards A are provided with bearings for a rotary shaft B, which is provided with a pulley B', to which motion is imparted by a suitable driving-belt.

To the shaft B is applied the hub $C^x$ of a spider-frame C, which latter supports a circular frame C', to which are applied a number of radial bracket-arms $C^2$, that support in sockets $C^3$ of transverse connecting-straps $C^4$ the spindles of a series of buckets D, which spindles are secured to said sockets and arranged in such a manner that the ends of one bucket abut against the ends of the adjoining buckets, as shown in Fig. 1. The opposite ends of the bucket-supporting straps $C^4$ are attached to fixed arms of a second spider-frame, which is formed of as many radial tubular arms or spokes E as there are buckets, each arm being in line with the center of its corresponding bucket D. The inner ends of the tubular arms E are secured to a radially-perforated hub E', which is secured by stuffing-boxes $E^2$ at both ends of the hub to the rotary shaft B. The radial perforations of the hub E' communicate with a central longitudinal air-channel $e$ in the shaft B, which channel is connected by a pipe $e'$ with an air-pump or other suitable air-suction apparatus. The hubs of the spider-frames C and E are connected by lateral braces $E^4$, which are supported in boxes $E^5$ of the hubs $C^\times$ and E', so as to prevent the axial shifting of the spider-frames.

At the outer ends of the arms E are arranged hollow laterally-extending jaws F, which are provided with central openings that communicate with the tubular arms E and with elastic tubular faces or cheeks $f$, that are retained by screw-sleeves $f'$, as shown clearly in Figs. 5 and 6. The tin cans to be tested are tightly pressed against the elastic cheeks of the hollow jaws F by means of presser-jaws F', which are arranged opposite to the hollow jaws F and guided by their fixed shanks $f^2$ in sockets $f^3$ of the circular frame C'. The jaws F' are pressed against the bottom of the cans by the action of spiral springs $f^4$, which are interposed between the ends of the sockets $f^3$ and heads $f^5$ at the outer ends of the shanks $f^2$. The shanks $f^2$ are secured into sockets of the presser-jaws F' and retained in said sockets by set-screws $f^\times$.

Between the ends of the shanks $f^2$ and the bottoms of the sockets are interposed a number of washers $w$, as shown in Fig. 2, by means of which the presser-jaws F' can be adjusted accurately for the different sizes of cans to be tested on the machine. The heads $f^5$ are beveled and acted upon by the beveled ends of spring-actuated pusher-rods $f^6$, that are guided in radial bracket-arms $f^7$ of the supporting spider-frame C. In Fig. 1 three shanks $f^2$ are shown, the remaining arms being omitted.

The pusher-rods $f^6$ are provided at their outer ends with anti-friction rollers $f^8$, which form contact with a stationary cam $F^2$, located above the machine, said cam being concentric to the axis of the same and provided with straight or bent portions at its opposite ends, along which the anti-friction rollers $f^8$ are guided, so that the pusher-rods $f^6$ are acted upon by the cam $F^2$ whenever they arrive below the same.

Each bucket D is provided at that edge adjoining the presser-jaw F' with a spring-actuated releasing-catch $d$, that is beveled toward the outer end and engaged by a beveled catch $d'$ at the lower part of the presser-jaw F'. When the presser-jaw F' is applied to the can by the action of the cam $F^2$ and pusher-rod $f^6$ on its shank $f$, the catch $d'$ engages the spring-actuated catch $d$ and forces the same against the tension of the springs $d^2$ $d^2$ away from the can, as shown clearly in Figs. 5 and 6. As soon as the presser-jaw F' is removed from the can the catch $d'$ releases the catch $d$, so that the latter presses against the bottom edge of the can and causes the same to drop from the hollow jaw whenever the pressure of the spring-catch overcomes the suction caused by the vacuum in the can.

At the upper part of the machine is arranged vertically above the buckets D an inclined chute G, through which the cans to be tested are supplied to the buckets D at the circumference of the rotary frame of the machine. The chute G is provided at one side of its mouth with a hinged drop-gate $g$, that permits the free discharge of the cans from the chute onto the buckets D.

Each tubular arm E of the machine is provided below the suction-jaw F with a hollow valve H, that is shown in detail in Fig 4. To the spindle of each valve H is attached an elbow-lever H', the longer arm of which forms contact with a stop-pin $h$ at the upper end of a bracket-arm $H^2$, that is supported in a stationary hanger $H^3$, (shown in Figs. 2 and 7,) while the shorter arm of each elbow-lever H' is engaged by a second stop-pin $h'$ on a shorter bracket-arm $H^4$, also supported by said hanger. The pins $h$ $h'$ are so supported as to be in the path of the valve-levers H'.

The hollow valve H is constructed in the nature of a three-way valve, the fixed casing being provided with three channels or apertures $i'$ $i^2$ $i^3$, while the plug of the valve has also three apertures $l'$ $l^2$ $l^3$, of which the apertures $i'$ $i^2$ are diametrical to each other and in line with the tubular arms E, while the aperture $i^3$ communicates with the atmosphere. The plug of the valve is also provided with two diametrical apertures $l'$ $l^2$ and with a third aperture $l^3$ at a distance from the aperture $l^2$ equal to the distance of the aperture $i'$ from the aperture $i^3$. When the plug of the valve H is turned in the direction of the arrow, Fig. 4, the valve is first changed from its open position into a closed position in which the apertures of the plug do not register with the apertures of the casing, as shown in Fig. 4$^a$. By turning the plug still more the aperture $l'$ registers with the aperture $i^3$ and the aperture $l^3$ with the aperture $i^2$, in which position the suction-valve communicates with the atmospheric air, as shown in Fig. 4$^b$.

A fixed guard-band L extends around half the circumference of the machine. The band L is concentric to the axis of the machine and provided at the upper end with an outwardly-bent portion $l$, so that the cans supported on the buckets of the rotating frame are guided along the guard-band L until they arrive at the lower end of the same, where said band connects with an inclined discharge-chute L' for the leaky cans, while a second inclined discharge-chute $L^2$ above the chute L' serves for conducting off the good cans, which are released at that point from the hollow jaws of the machine. This is accomplished by means of a third stop-pin $h^2$, that is supported in the path of the longer arms of the valve-operating levers H', as shown in Fig. 1, said pin setting the valves H in such a position that the apertures $l'\ i^3$ of the same register with each other and establish communication of the cans with the atmosphere. The discharge-chute $L^2$ is provided with a hinged and spring-pressed gate M at its inner end, which yields to the pressure of the cans sufficiently to permit them to pass beyond the edge of the gate without being injured by forcible contact with said edge. After passing the gate the cans are conducted off by the chute $L^2$.

The operation of the machine is as follows: The supporting spider-frames C E are slowly rotated and one can after the other supplied to the buckets D, arranged at the circumference of the spider-frames, from the upper supply-chute G, to which the soldered cans are conveyed in any suitable manner. Immediately after the tin cans are delivered to the buckets the presser-jaws F' are tightly pressed by the action of the pusher-rods $f^6$ against the bottom of the cans, whereby the open top parts of the cans are pressed firmly against the elastic cheeks of the hollow jaws F, as shown in Fig. 2. The valve H of the corresponding tubular arm E is then opened by the contact of the shorter arm of the elbow-lever H' with the fixed pin $h'$, so that the apertures $l'\ l^2$ of the valve-plug register with the apertures $i'\ i^2$, which communicate with the interior of the hollow jaw and by the tubular arm E with the air-suction apparatus. A vacuum is thereby established in the cans until by the contact of the longer arm of the elbow-lever H' with the fixed pin $h$ the valve-plug is turned and the connection of the hollow jaw and can with the air-suction apparatus interrupted. The vacuum produced in the cans by the action of the air-pump is retained in the same during the rotation of the spider-frames until it is either partially destroyed in the case of leaky cans by the gradual ingress of air through the leaks of the can or by the contact of the longer arms of the elbow-levers H' with the lower stop-pin $h^2$, by which the air is admitted into the cans, as the apertures $l^2$ and $l^3$ of the valve-plug register with the apertures $i^3$ and $i^2$ of the valve-casing and establish communication with the atmosphere. As soon as the spring-actuated rods $f^6$ of the presser-jaws F' pass beyond the stationary cam $F^2$ at the upper part of the machine, the presser-jaws are released from the cans by the action of the springs $f^3$ on the shanks of the jaws, while simultaneously the beveled catches $d'$ are withdrawn from the spring-catches $d$ of the buckets, so that the latter exert an outward pressure on the cans, which tends to remove the same from the hollow jaws as soon as the suction in the cans is diminished or entirely interrupted. Whenever the pressure of the spring-catches $d\ d$ overcomes the suction exerted on the can by the vacuum in the same, they are dropped off from the hollow jaws. In leaky or faulty cans the air enters slowly through the fine holes or leaks in the can, so that the vacuum in the same is gradually destroyed and the cans dropped from the hollow jaws on the surrounding guard-band L and rolled along the same until they are delivered to the discharge-chute L' for the defective cans. The good and sound cans are retained on the hollow jaws until the longer arms of the elbow-levers form contact with the fixed lower pin $h^2$, by which the valve-plugs are turned and the air admitted into the hollow jaws and the interior of the cans, which are then dropped off and conducted along the discharge-chute $L^2$ to a suitable receiver. At each rotation of the machine as many cans as there are radial arms and hollow jaws are tested and assorted in a reliable and effective manner, and thereby the testing accomplished in a quick and automatic manner by pneumatical action without the employment of the hydraulic testing devices heretofore in use, which require the drying of the cans after the testing operation, which drying is entirely dispensed with by the use of my pneumatic testing-machine.

Having thus described my invention, I claim as new and desire to secure by Letters Patent—

1. The combination of a rotary spider-frame having a series of supporting-buckets for the cans to be tested, hollow jaws at one side of the same, spring-actuated presser-jaws at the opposite side of the buckets, and spring-actuated pusher-rods acting on the shanks of the presser-jaws for applying or releasing the presser-jaws from the cans, substantially as set forth.

2. The combination of a rotary spider-frame having a series of supporting-buckets for the cans to be tested, hollow jaws applied to one side of the cans, radial tubular arms connecting the hollow jaws with a suction apparatus for establishing a vacuum in the cans, spring-actuated presser-jaws acting on the bottom of the cans, and spring-actuated pusher-rods acting on the shanks of said presser-jaws, substantially as set forth.

3. The combination of a series of supporting-buckets for the cans to be tested, radial tubular arms connected to a suction apparatus, hollow jaws at the outer ends of said arms, and valves in said arms for establishing, retaining, or interrupting the vacuum in the cans, substantially as set forth.

4. The combination of a series of supporting-buckets for the cans to be tested, hollow jaws at the side of the same, presser-jaws at the other side of the same, a chute for supplying the cans to the buckets, and discharge-chutes for conducting off, respectively, the leaky and sound cans, substantially as set forth.

5. The combination of a series of supporting-buckets for the cans to be tested, hollow jaws at one side, and spring-actuated presser-jaws at the opposite side of the same, spring-catches for releasing the presser-jaws from the cans, and a guard-band for conducting the bad cans to the discharge-chute, substantially as set forth.

6. The combination of a supporting spider-frame provided with a series of can-supporting buckets for the cans to be tested, a second spider-frame formed of as many tubular arms as there are buckets, hollow jaws at the outer ends of said tubular arms, valves in said arms, elbow-levers attached to the spindles of said valves, and stationary pins for actuating the elbow-levers, so as to establish, retain, and discontinue the vacuum in the cans, substantially as set forth.

7. The combination of a rotary spider-frame provided with a series of buckets for the cans to be tested, spring-actuated presser-jaws supported by said spider-frame, spring-actuated pusher-rods engaging the shanks of said jaws, and a stationary cam for operating said pusher-rods and applying the presser-jaws to the cans, substantially as set forth.

8. The combination of a rotary spider-frame having can-supporting buckets, each bucket being provided with a can-releasing spring-catch, spring-actuated presser-jaws having fixed beveled catches for engaging said spring-catches, spring-actuated pusher-rods guided in brackets of the spider-frame, and a stationary cam arranged concentric to the axis of the spider-frame, substantially as set forth.

9. The combination of a rotary spider-frame having supporting-buckets for the cans, spring-actuated presser-jaws applied to the bottom of the cans, a second spider-frame formed of radial tubular arms connected to a suction apparatus, hollow jaws at the outer ends of said arms, and supply and discharge chutes for the cans, substantially as set forth.

10. The combination of a rotary spider-frame having supporting-buckets for the cans to be tested, a second spider-frame formed of radial tubular arms communicating with a hollow supporting-shaft, the latter being connected to an air-suction apparatus, valves in said tubular rods, elbow-levers applied to the spindles of said valves, and stationary pins adapted to engage the elbow-levers of the valves, so as to set the same for establishing communication with the air-suction apparatus or with the atmosphere, substantially as set forth.

11. The combination of a rotary spider-frame having series of can-supporting buckets, a second spider-frame formed of radial tubular arms, a hollow shaft connected to an air-suction apparatus, hollow jaws at the outer ends of the tubular arms, valves in said tubular arms, elbow-levers applied to the spindles of said valves, stationary pins for setting said valves, a concentric guard-band extending around part of the spider-frames for retaining and guiding the leaky cans, a supply-chute at the upper part of the apparatus, and two inclined chutes at the lower part of the same for discharging, respectively, the leaky and good cans, substantially as set forth.

12. The combination of the presser-jaws, spring-actuated shanks secured to said jaws and provided with beveled heads, spring-actuated pusher-rods having beveled ends adjoining the heads of said shanks, and stationary cams for actuating said pusher-rods, substantially as set forth.

13. In a can-testing machine, a hollow jaw provided with an elastic annular face-cheek and a central tubular screw-plug for holding the elastic cheek in position, substantially as set forth.

In testimony that I claim the foregoing as my invention I have signed my name in presence of two subscribing witnesses.

RICHARD STEEGMÜLLER.

Witnesses:
PAUL GOEPEL,
CARL KARP.